US006354701B2

(12) United States Patent
Korem

(10) Patent No.: US 6,354,701 B2
(45) Date of Patent: *Mar. 12, 2002

(54) APPARATUS AND METHOD FOR PRINTING

(75) Inventor: Aharon Korem, Herzlia (IL)

(73) Assignee: Aprion Digital Ltd., Netanya (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/083,004

(22) Filed: May 21, 1998

Related U.S. Application Data

(63) Continuation-in-part of application No. PCT/IL96/00150, filed on Nov. 13, 1996.

(30) Foreign Application Priority Data

Nov. 23, 1995 (IL) ............................................... 116123

(51) Int. Cl.[7] ............................................... G01D 15/18

(52) U.S. Cl. ........................ 347/106; 347/103; 347/105

(58) Field of Search ................................ 101/453, 454, 101/457–460, 462, 150, 153, 170, 401.1; 347/101, 103, 105, 104, 106

(56) References Cited

U.S. PATENT DOCUMENTS

| | | | | | |
|---|---|---|---|---|---|
| 4,036,130 A | * | 7/1977 | Giori | 101/170 |
| 4,092,165 A | * | 5/1978 | Andrus et al. | 101/DIG. 37 |
| 4,162,502 A | * | 7/1979 | Cielo et al. | 347/55 |
| 4,166,277 A | * | 8/1979 | Cielo et al. | 347/47 |
| 4,263,601 A | * | 4/1981 | Nishimura et al. | 347/55 |
| 4,387,382 A | * | 6/1983 | Kohashi | 347/55 |
| 4,503,111 A | | 3/1985 | Jaeger et al. | 195/428 |
| 4,566,384 A | * | 1/1986 | Matsumoto | 101/170 |
| 4,729,310 A | * | 3/1988 | Love, III | 101/170 |
| 4,855,768 A | | 8/1989 | Ilno | 346/160.1 |
| 4,920,501 A | | 4/1990 | Sullivan et al. | 364/518 |
| 5,001,821 A | | 3/1991 | Herb | 29/121.2 |
| 5,093,180 A | | 3/1992 | Morgan | 428/156 |
| 5,099,256 A | | 3/1992 | Anderson | 347/103 |
| 5,129,321 A | | 7/1992 | Fadner | 101/467 |
| 5,134,936 A | * | 8/1992 | John | 101/170 |
| 5,205,212 A | | 4/1993 | Wolfe | 101/170 |
| 5,378,580 A | | 1/1995 | Leenders | 430/303 |
| 5,389,958 A | | 2/1995 | Bui et al. | 103/347 |
| 5,508,828 A | | 4/1996 | Gershony et al. | 358/536 |
| 5,539,440 A | | 7/1996 | Higuchi et al. | 347/112 |

FOREIGN PATENT DOCUMENTS

| | | |
|---|---|---|
| EP | 125113 | 11/1984 |
| EP | 583168 | 2/1994 |
| EP | 604025 | 6/1994 |
| EP | 638423 | 2/1995 |
| EP | 0 640 481 A2 | 3/1995 |
| JP | 06092006 | 4/1994 |
| JP | 07032721 | 2/1995 |

* cited by examiner

*Primary Examiner*—Stephen R. Funk
(74) *Attorney, Agent, or Firm*—Eitan, Pearl, Latzer & Cohen-Zedek

(57) ABSTRACT

A printing method and system which includes at least one printing apparatus is provided. Each printing apparatus includes a printing member for selectively receiving ink into an ink receptive portion, the ink receptive portion includes a plurality of ink receptive dots forming a pattern in a desired resolution and an ink repelling portion, the ink repelling portion includes the entire area of the printing member except the ink receptive dots. Each printing apparatus includes at least one printing unit, preferably but not necessarily an ink-jet printing unit, the printing unit for applying ink onto the printing member in accordance with a pattern representing an image to be printed, thereby forming an ink image on a portion of the ink receptive dots, and a transfer system for transferring the ink image onto a printing substrate.

10 Claims, 13 Drawing Sheets

APPARATUS AND METHOD FOR PRINTING

RELATED APPLICATION

This application is a continuation in part application of International Patent Application Serial Number PCT/IL 96/00150 filed Nov. 13, 1996.

FIELD OF THE INVENTION

The present invention relates generally to digital printing systems and more particularly to an indirect digital printing system in which an ink image is formed on a printing member for subsequent transfer onto a printing substrate.

BACKGROUND OF THE INVENTION

Two general types of printing systems are known in the art for printing digitally stored images, namely direct printing Systems and indirect printing systems. In direct printing systems, one copy of the stored digital image is printed per one output of the digital data, the digital data being employed to control the flow of ink or other colorant, so as to form the printed image on the printing substrate. An example of a direct printing system is ink-jet printing systems.

Ink-jet printing systems in which ink is applied directly to the printed substrate have many deficiencies, inter alia, the following:

(1) Dust carried by the printing substrate and, when the substrate is paper, lint may also clog the orifices of the ink-jet nozzles. To minimize clogging, the substrate is placed at a relatively large distance from the nozzles, the large distance resulting in larger inaccuracy of the applied ink and leads to deficient quality of the printed image.

(2) For proper jetting, the ink must be of low viscosity, but this may cause undesirable spreading or penetration of the ink droplets on the medium and may also make the drying process lengthy or complex.

In indirect printing systems, on the other hand, the digital image is recorded on a printing plate, the printing plate includes a pattern of ink-receptive areas representing the recorded image within non-ink-receptive areas, and the printing process consists of applying ink to the entire surface of the printing form, wherein only the recorded image areas, i.e. the ink-receptive areas, retain the applied ink, and transferring the retained ink by contact to the printing substrate so as to form the printed image. The indirect printing process, carried out in a printing press, is classified according to the type of printing plate utilized, the three primary classes being salient, also known as letterpress or flexo; planographic, also known as lithographic or offset; and intaglio, also known as gravure.

Salient and planographic printing plates are usually configured as plates that are mounted around a cylinder in the printing press, while intaglio is usually formed on the surface of a solid cylinder.

The terms letter press, offset and gravure are used hereinbelow to indicate the three types of printing plates in any form, such as in the form of a plate or as a part of the printing cylinder.

In conventional printing presses, the image is recorded on the printing plate or cylinder off-press. In digital presses, in particular in digital offset presses, such as the Quick Master DI46-4, commercially available from Heidelberg Drachmachinen of Germany, the image is recorded on printing plate on-press, i.e. while the printing plate is mounted on the printing press.

In another indirect printing system known in the art, described in U.S. Pat. No. 4,855,768 to Iino et al a printing member is formed from ink receptive dots forming a grid and from an ink repelling portion of ink repelling dots therebetween. Ink is applied onto the entire printing member and retained by all the ink receptive dots and then selectively transferred therefrom using electrostatic force so as to form the printed image.

SUMMARY OF THE INVENTION

A primary object of the present invention is to provide an indirect digital printing system and method for selectively applying ink on a printing member in accordance with the digital data representing the image to be printed so as to form an ink image thereon, the ink image subsequently transferred to a printing substrate, such as paper.

A further object of the present invention is to provide an improved digital printing press which employs an ink-jet printing unit for applying ink on a printing member so as to form an ink image thereon and a transfer system for transferring the ink image onto a printing substrate.

Still another further object of the present invention is to provide an indirect ink-jet printing system which employs an ink-jet printing unit for selectively applying ink on a printing member so as to form an ink image thereon and a transfer system for transferring the ink image onto a printing substrate.

Yet another object of the present invention is to provide an ink-jet printing system having improved accuracy and resolution with respect to prior art ink-jet printing systems.

There is thus provided, according to a preferred embodiment of the present invention, a printing system which includes at least one printing apparatus. Each printing apparatus includes a printing member for selectively receiving ink into an ink receptive portion, the ink receptive portion includes a plurality of ink receptive dots forming a pattern in a desired resolution and an ink repelling portion, the ink repelling portion includes the entire area of the printing member except the ink receptive dots. Each printing apparatus includes at least one printing unit, preferably but not necessarily an ink-jet printing unit, the printing unit for applying ink onto the printing member in accordance with a pattern representing an image to be printed, thereby forming an ink image on a portion of the ink receptive dots, and a transfer system for transferring the ink image onto a printing substrate.

Further, in accordance with a preferred embodiment of the present invention, each printing apparatus also includes a cleaning system, the cleaning system for cleaning the printing member after the operation of the transfer system.

Still further, the printing apparatus may include at least one heating system, the heating system for heating the printing member.

Additionally, where the ink used in the printing system is a UV curable ink, the printing system may further include a UV curing system downstream the at least one transfer system, the UV curing system for curing the UV curable ink transferred to the printing substrate.

In accordance with a preferred embodiment of the present invention, each printing apparatus includes a plate cylinder, the plate cylinder for mounting the printing member thereon and the transfer system includes a blanket cylinder for transferring the applied ink to a printing substrate and an impression cylinder for impressing the printing substrate against the blanket cylinder.

According to an alternative preferred embodiment of the present invention, the printing member is a gravure like cylinder having depressions forming the ink receptive dots and elevated portions forming the ink repelling portion and the transfer system includes an impression cylinder for impressing the printing substrate against the gravure like cylinder.

According to yet another alternative embodiment of the present invention, the printing member is a cylinder having elevated portions forming the ink receptive portion and depressions forming the ink repelling portion. Further, the printing apparatus may include a blanket cylinder for transferring the applied ink to a printing substrate and an impression cylinder for impressing the printing substrate against the blanket cylinder. Alternatively, the transfer system includes an impression cylinder for impressing the printing substrate against the gravure like cylinder.

In accordance with yet another preferred embodiment of the present invention, the printing member is a rotatable belt having elevated portions forming the ink receptive portion and depressions forming the ink repelling portion. Further, the transfer system includes a blanket cylinder for transferring the applied ink to a printing substrate and an impression cylinder for impressing the printing substrate against the blanket cylinder. Alternatively, the transfer system includes an impression cylinder for impressing the printing substrate against the rotatable belt.

Further, according to any of the preferred embodiments of the present invention, the at least one ink-jet unit includes a line array of ink jet nozzles operating to apply the ink onto the printing member substantially simultaneously. The resolution of the ink receptive dots may be substantially similar to or higher than the resolution of the nozzles.

Still further, according to any of the preferred embodiments of the present invention, the ink is an aqueous based ink, the ink receptive dots are hydrophilic and the ink repelling portion is hydrophobic. Alternatively, the ink is a non-aqueous based ink, the ink receptive dots are oleophilic and the ink repelling portion is oleophobic.

Further, in accordance with a preferred embodiment of the present invention, each printing apparatus also includes a cleaning system, the cleaning system for cleaning the printing member after the operation of the transfer system.

Still further, the printing apparatus may include at least one heating system, the heating system for heating the printing member.

Additionally, where the ink used in the printing system is a UV curable ink, the printing system may further include a UV curing system downstream the at least one transfer system, the UV curing system for curing the UV curable ink transferred to the printing substrate.

In accordance with a preferred embodiment of the present invention, each printing apparatus includes a plate cylinder, the plate cylinder for mounting the printing member thereon and the transfer system includes a blanket cylinder for transferring the applied ink to a printing substrate and an impression cylinder for impressing the printing substrate against the blanket cylinder.

According to an alternative preferred embodiment of the present invention, the printing member is a gravure like cylinder having depressions forming the ink receptive dots and elevated portions forming the ink repelling portion and the transfer system includes an impression cylinder for impressing the printing substrate against the gravure like cylinder.

According to yet another alternative embodiment of the present invention, the printing member is a cylinder having elevated portions forming the ink receptive portion and depressions forming the ink repelling portion. Further, the printing apparatus may include a blanket cylinder for transferring the applied ink to a printing substrate and an impression cylinder for impressing the printing substrate against the blanket cylinder. Alternatively, the transfer system includes an impression cylinder for impressing the printing substrate against the gravure like cylinder.

In accordance with yet another preferred embodiment of the present invention, the printing member is a rotatable belt having elevated portions forming the ink receptive portion and depressions forming the ink repelling portion. Further, the transfer system includes a blanket cylinder for transferring the applied ink to a printing substrate and an impression cylinder for impressing the printing substrate against the blanket cylinder. Alternatively, the transfer system includes an impression cylinder for impressing the printing substrate against the rotatable belt.

Further, according to any of the preferred embodiments of the present invention, the at least one ink-jet unit includes a line array of ink jet nozzles operating to apply the ink onto the printing member substantially simultaneously. The resolution of the ink receptive dots may be substantially similar to or higher than the resolution of the nozzles.

Still further, according to any of the preferred embodiments of the present invention, the ink is an aqueous based ink, the ink receptive dots are hydrophilic and the ink repelling portion is hydrophobic. Alternatively, the ink is a non-aqueous based ink, the ink receptive dots are oleophilic and the ink repelling portion is oleophobic.

According to yet another preferred embodiment of the present invention, the number of printing apparatus corresponds to the number of printing inks forming the ink image. Preferably, but not necessarily, the printing system includes four printing apparatus, each for inking one of the four process colors CMYK.

There is also provided, according to a preferred embodiment of the present invention, a printing method which includes the following steps:

a. providing a printing member for selectively receiving ink onto an ink receptive portion, the ink receptive portion includes a plurality of ink receptive dots forming a pattern in a desired resolution; and an ink repelling portion, the ink repelling portion includes the entire area of the printing member except the ink receptive dots;

b. applying ink onto the printing member in accordance with a pattern representing an image to be printed so as to form an ink image on a portion of the ink receptive dots; and c. transferring the ink image onto a printing substrate.

Further, the method may also include the step of cleaning the printing member after the transferring. Still further, the method may also include the step of heating the printing member.

According to a preferred embodiment of the present invention, the ink is a UV curable ink and the printing method further includes the step of curing the UV curable ink after the transferring.

Further, according to yet another preferred embodiment of the present invention, the method also includes the step of forming the ink receptive dots in a higher resolution than the resolution provided in the step of applying.

Finally, there is provided in accordance with a preferred embodiment of the present invention, a printing member for selectively receiving ink, the printing member includes an ink receptive portion, the ink receptive portion includes a plurality of points forming a pattern of ink receptive dots in a desired resolution and an ink repelling portion, the ink repelling portion includes the entire area of the printing member except the ink receptive dots, the printing member for selectively receiving an ink image on a portion of the ink receptive dot, the ink image corresponding to a digital representation of an image. Preferably, the printing member includes at least two layers, a first layer forming the ink receptive dots and a second different layer forming the ink repelling portion.

In accordance with one preferred embodiment of the present invention, the printing member having depressions forming the ink receptive dots and elevated portions forming the ink repelling portion. According to an alterative embodiment of the present invention, the printing member having elevated portions forming the ink receptive dots and depressions forming the ink repelling portion.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Reference is now made to FIGS. 1A–1F. FIGS. 1A–1F illustrate a schematic portion of three alternative printing members for selectively receiving ink, referenced 10 (FIGS. 1A and 1D), 20 (FIGS. 1B and 1E) and 30 (FIGS. 1C and 1F), respectively.

Each of the printing members 10, 20 and 30 comprises an ink receptive portion, the ink receptive portion comprising a plurality of grid points forming a pattern of ink receptive dots 12, 22, and 32 respectively, and an ink repelling portion, referenced 14, 24 and 34, respectively, which forms the entire area of the printing member except the ink receptive dots 12, 22 and 32, respectively.

In the illustrated embodiments only exemplary ink receptive dots 12, 22 and 32 are referenced.

The printing members 10, 20 and 30 are particularly useful for receiving ink applied by ink-jet printing units and minimize the deficiencies associated with indirect ink-jet printing as described hereinbelow with reference to FIGS. 2A–2C and 3A–3C.

Figure 1A:
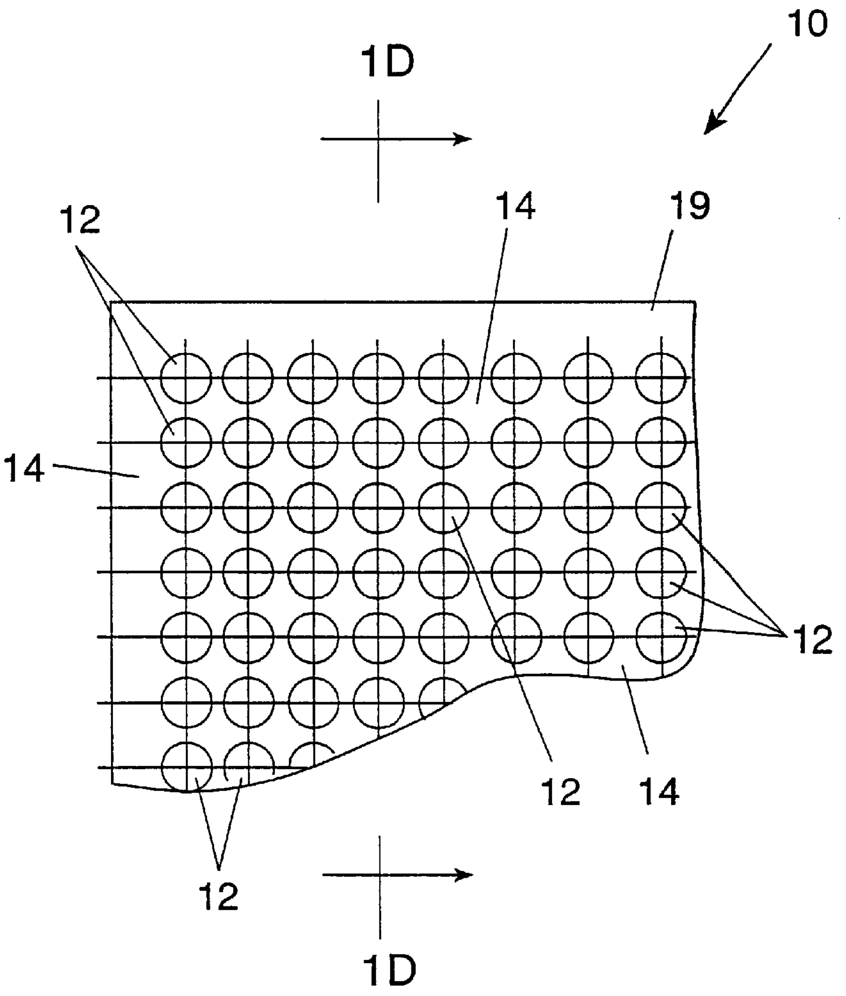
FIGS. 1A–1C are schematic illustrations of three printing members for selectively receiving ink, constructed according to three preferred embodiments of the present invention.
Figure 1D:
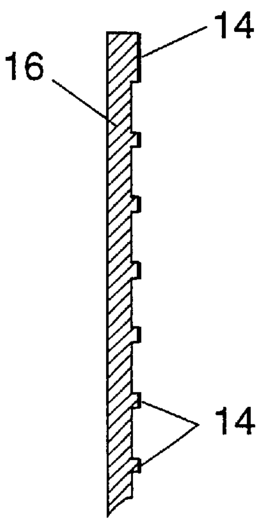
FIGS. 1D–1F are schematic cross sections of the printing members of FIGS. 1A–1C, respectively.

As shown in FIG. 1D, the printing member 10 (FIG. 1A) comprises at least two layers, one being an ink receptive layer 16 and the other being an ink repelling layer 14 wherein the ink receptive layer is exposed in the dots 12 which form a grid pattern 19 on the printing member 10.

Figure 1B:
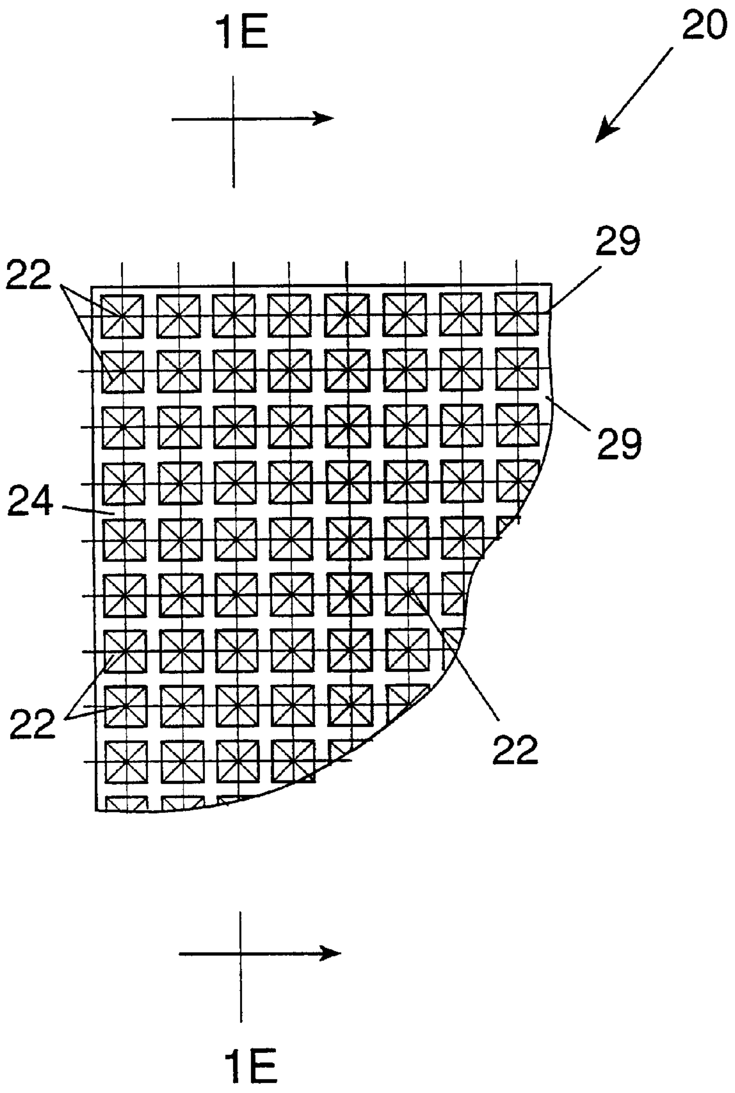
Figure 1E:
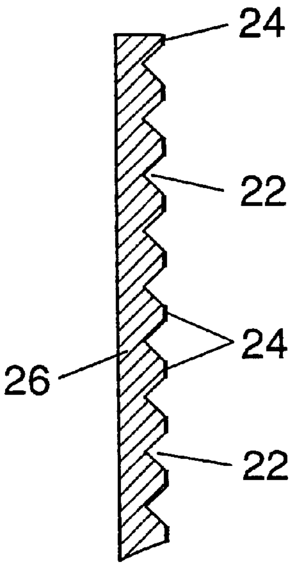
Figure 1C:
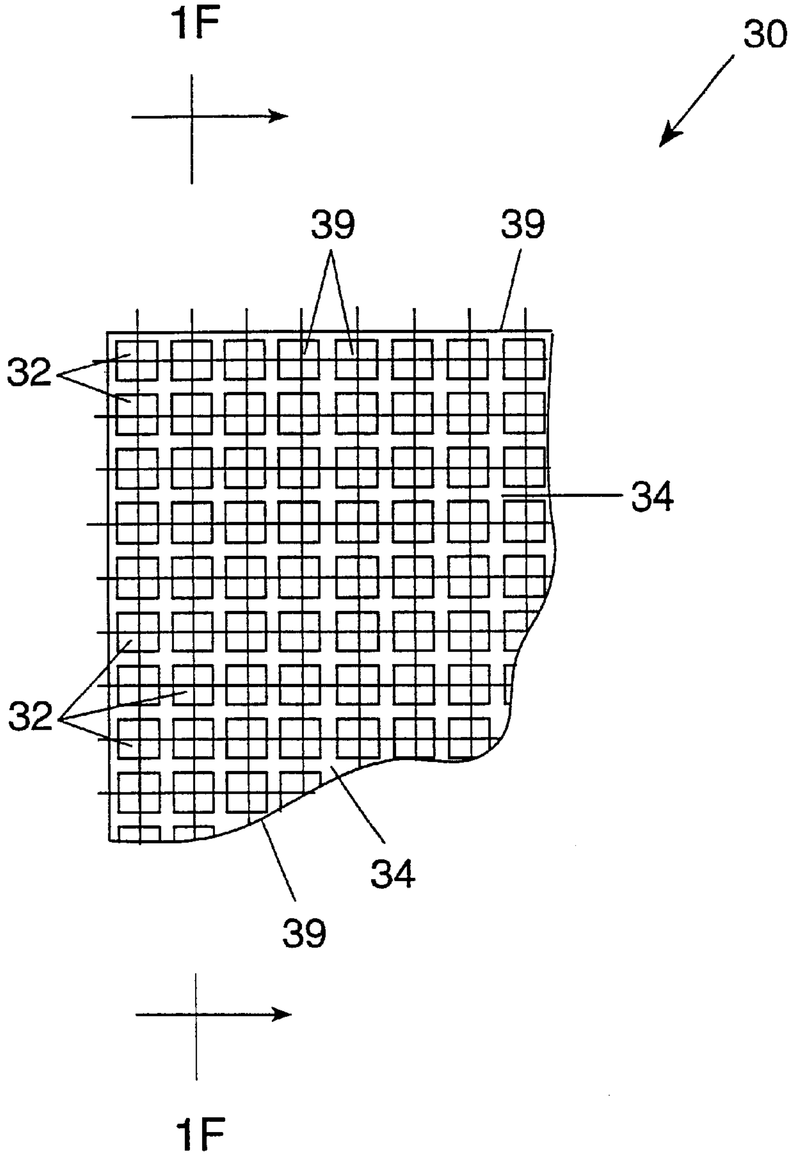

It will be appreciated that the grid pattern 19 as well as the grid patterns 29 and 39 of printing members 20 and 30 are illustrated in FIGS. 1A–1C, respectively, only for explanatory purposes. The printing members 10, 20 and 30 need not include any marking of the grid pattern thereon.

It will be further appreciated that the pattern of ink receptive dots 12, 22, and 32 and ink repelling portion, referenced 14, 24 and 34, (of the ink receptive portion of printing members 10, 20 and 30, respectively) may comprise any pattern including random patterns (to be described hereinbelow) and is not restricted to a pattern composed of grid points. The description of grid points in FIGS. 1A–1F is given by way of example only.

The printing member 10 may be similar to any offset printing plate in having an ink receptive portion and an ink repelling portion. However, unlike prior art offset printing plates, the printing member 10 comprises a predefined grid 19 of ink receptive dots 12 which receive the ink applied by an ink jet printing unit.

For example, if the ink-jet ink is an oil based ink, the printing member 10 may be produced from an oleophilic polyester substrate and a silicone oleophobic coating. An example of a printing plate having a polyester substrate and silicone coating thereon is described in U.S. Pat. No. 5,378,580 to Leenders. By ablating the silicone coating of the printing member and exposing its oleophilic polyester substrate in accordance to the desired grid 19, oleophilic dots 12 are formed.

The grid pattern of ink receptive dots 12 of the printing member 10 may be produced by any suitable method known in the art for producing printing plates. It may be produced by producing a film by an image setter, such as the Dolev 800 image setter, commercially available from Scitex Corporation Ltd. of Herzlia, Israel, and transferring the grid recorded on the film onto the printing member 10. Alternatively, the grid may be produced directly by a plate setter operating to record the grid 19 of dots 12 directly on the printing member 10. An example of a suitable plate setter is the Raystar, commercially available from Scitex Corporation Ltd. of Herzlia, Israel.

It will be appreciated that the printing member 10 is produced substantially similarly to any other prior art printing plate. However, unlike prior art printing plates on which the image is recorded, the grid 19 of ink receptive dots 12 is recorded to form the printing member 10.

The printing member 20 (FIGS. 1B and 1E) may be similar to a gravure printing plate in that it has ink receptive material 26 having depressions 22 and ink repelling elevated portions 24. However, in contrast to any prior art gravure cylinder which includes a recorded image thereon, the printing member 20 comprises a grid 29 of ink receptive depressions 22 for selectively receiving ink so as to form the ink image thereon.

It will be appreciated that the printing member 20 may be produced by any suitable method for producing prior art engraved cylinders, such as gravure cylinders. However, according to the present invention, a grid 29 of dots 22 is produced to form the printing member 20 while prior art gravure cylinders include a recorded image thereon.

The printing member 30 (FIGS. 1C and 1F) may be similar to a letter press printing plate in that it has ink receptive elevated portions 32 and ink repelling depressions 34. However, in contrast to any prior art letter press cylinder which has a recorded image thereon, the printing member 30 comprises a grid 39 of ink receptive elevated portions 32.

It will be appreciated that the printing member 30 may be produced by any suitable method for producing prior art letter press cylinders. However, according to the present invention, a grid 39 of dots 32 is produced to form the printing member 30 while prior art letter press cylinders include 3 latent image thereon.

The ink attraction of the cells is based on one of two known physical phenomena; either surface tension or capillary force. In the case of printing member 10 (similar to an offset printing plate—FIGS. 1A and 1D), and printing member 30 (similar to a letter press printing plate—FIGS. 1C and 1F), the cells 12 and 32, respectively attract the ink due to surface tension while the backgrounds 14 and 34, respectively, reject the ink due to the relatively low surface tension.

In the case of printing member 20 (similar to a gravure printing plate—FIGS. 1B and 1E), the ink attraction is due to the capillary force produced and is related to the size and shape of the holes and the viscosity of the ink. The outer surface can be coated with an ink repelling coating which will further improve the process.

Unlike prior art printing plates, the printing members 10, 20 and 30 are usable for receiving ink thereon a large number of times so as to form different ink images thereon.

Further, unlike prior art printing plates which do not determine the resolution of the image recorded thereon, the printing members 10, 20 and 30 determine the resolution of the images recorded thereon. The resolution of each of the printing members 10, 20 and 30 is set in accordance with the spacing between the dots forming the grids 19, 29 and 39.

According to a preferred embodiment of the present invention, the printing members 10, 20 and 30 are used as printing members in any indirect digital printing system. Five preferred embodiments of printing systems utilizing a suitable printing member, such as the printing members 10, 20 and 30 are illustrated with reference to FIGS. 4–10 hereinbelow.

The printing members 10, 20 and 30 are particularly useful for receiving ink from any suitable printing unit capable of selectively applying ink on the printing member in accordance with a pattern representing the image to be printed so as to form an ink image thereon. A preferred printing unit for selectively applying ink on the printing members 10, 20 and 30 is an ink-jet printing unit. The ink-jet printing unit may be any suitable ink-jet printing unit. Non limiting examples are a moving ink-jet printing unit having a single nozzle, a moving ink-jet printing unit having an array of ink-jet nozzles, such as the ones produced by Hewlett Packard of California, U.S.A or a series of arrays one beside the other so as to simultaneously apply ink on any of the printing members 10, 20 and 30.

It will be appreciated that the term nozzle is used herein in a broad sense to indicate any suitable mechanism known in the art for ejecting ink droplets from an ink-jet printing unit. A non limiting example of such mechanism is described in published European Patent Application Number 640481 assigned to the assignee of the present application.

Figure 1F:
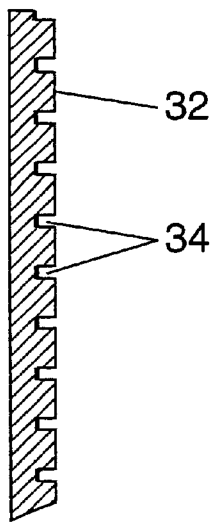
Figure 1G:
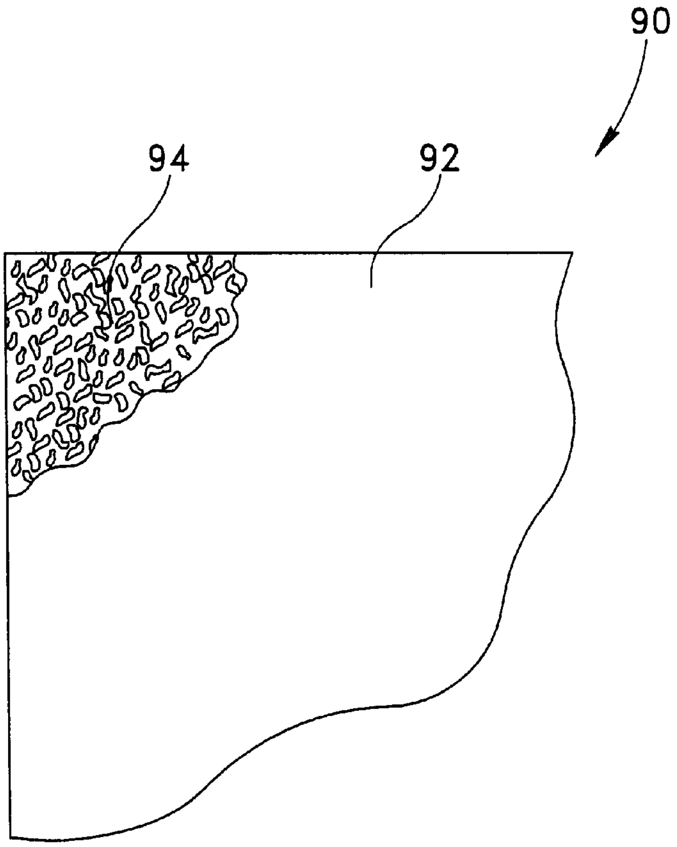
FIGS. 1G and 1H are schematic illustrations and a cross section thereof, respectively, of a printing member for selectively receiving ink, constructed according to a further preferred embodiment of the present invention.
Figure 1H:
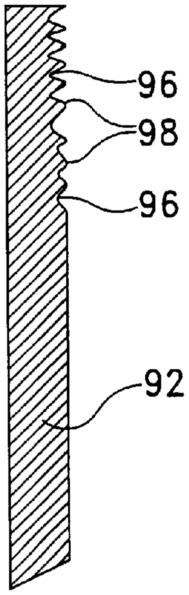

Reference is now made to FIGS. 1G–1H which illustrate a printing member, referenced 90, for selectively receiving ink, constructed according to a further preferred embodiment of the present invention.

The printing member 90 comprises an ink receptive material 92 having a random pattern, generally referenced 94, formed thereon. The random pattern 94, which covers approximately 70% of the material 92, comprises a plurality of ink repelling 96 and a plurality of ink receptive portions 98. In this case, printing member 90 acts similar to offset (FIGS. 1A and 1D) or letter press printing plates (FIGS. 1C and 1F).

Alternatively, printing member 90 may comprise a plurality of ink repelling (elevated) portions and a plurality of ink receptive depressions, in which case, printing member 90 acts similar to a gravure plate (FIGS. 1B and 1E). The random pattern may be generated by any suitable randomization function such as the screen frequent modulation FM screen (stochastic ) technique described in U.S. Pat. No. 5,508,828 assigned to the present applicants, or using error diffusion technique described in U.S. Pat. Nos. 4,920,501 assigned to Eastman Kodak Company of New York, USA.

The generated pattern is then engraved or otherwise formed on the printing member 90 by known in the art process such as, laser engraving or ablation, chemical etching or contact with a prepared film. Preferably for each color being printed, a separate randomization pattern is generated.

A grid pattern (described hereinabove with respect to FIGS. 1A–1F) compensates for inaccuracies in the alignment of the ink-jet ejectors caused by clogging and/or by manufacturer's tolerances. The random pattern reduces the effect of regular pattern error, such as missing, faint or dark lines. Additionally, as shown in FIGS. 1G and 1H, the random pattern allows for images of polygons and varied shapes, such as circles, ovals, triangles, squares, rectangles, irregular, combinations thereof, and so on.

Both the random pattern and the grid pattern overcome the deficiencies of direct to paper ink-jet printing.

While any suitable printing unit, in p)particular any ink-jet printing unit falls within the scope of the present invention, two preferred configurations of an ink-jet printing unit are illustrated with reference to FIGS. 2A–2C hereinbelow.

Figure 2A:
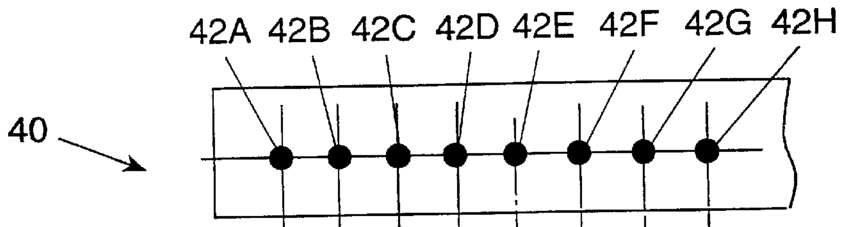
FIGS. 2A–2C illustrate two configurations of an ink-jet printing unit applying ink on the printing member of FIGS. 1A–1F.
Figure 2B:
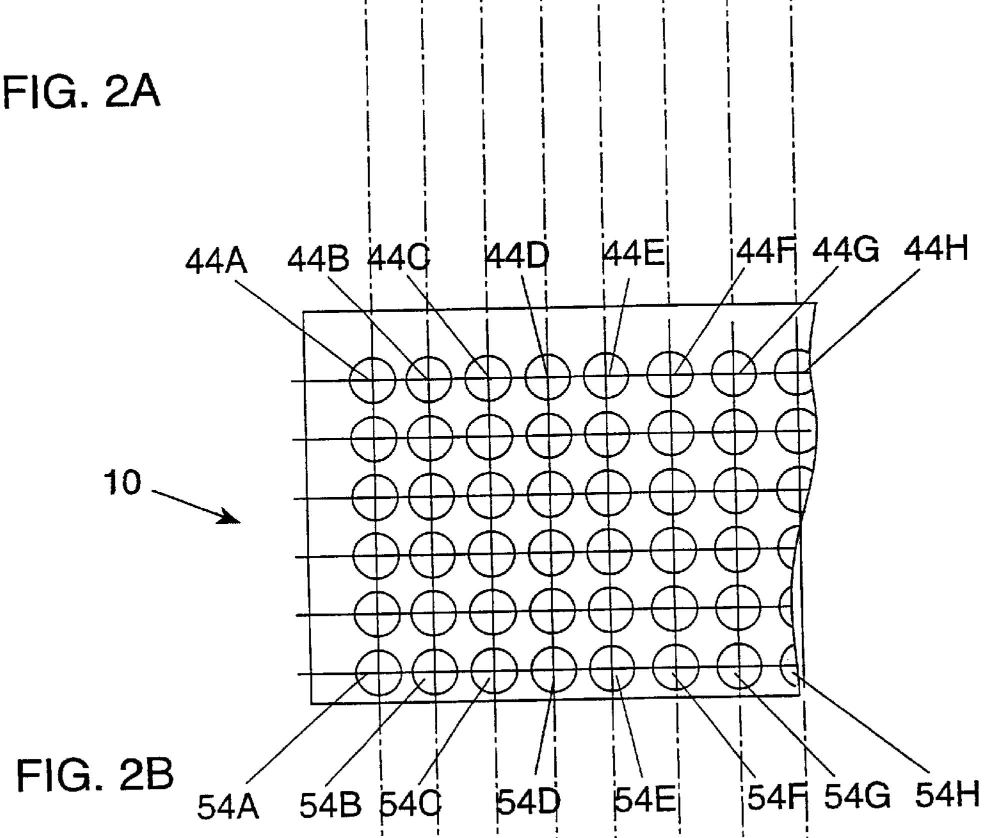
Figure 2C:
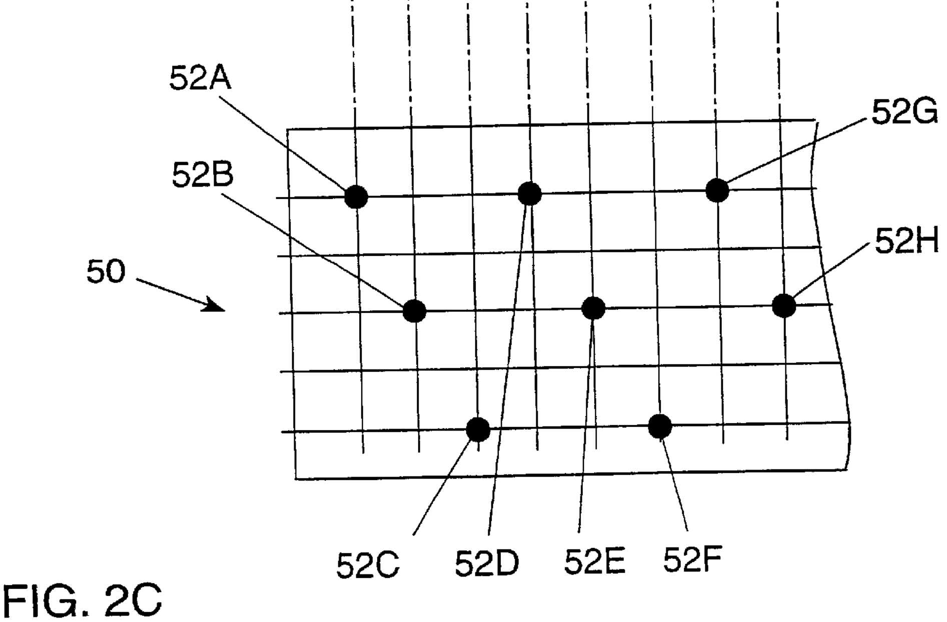

FIGS. 2A and 2C are schematic illustrations of two ink-jet printing units capable of applying ink onto the printing member of FIG. 2B. In the illustrated embodiment the printing member 10 is illustrated as a non limiting example of any of the printing members 10, 20 and 30.

FIG. 2A illustrates a printing unit 40 having an array of nozzles 42A–42H which may simultaneously apply ink on the ink receptive dots 44A–44H of a corresponding row of the printing member 10.

It will be appreciated that with the printing unit 40, the resolution of the ink image is determined by the resolution of the ink-jet nozzles.

In accordance with a preferred embodiment of the present invention, the resolution of the ink receptive dots determines the resolution of the ink image formed on the printing members. The ink receptive dots may be formed on the printing member in any desired resolution, including high resolutions, such as 600 ink receptive dots per inch (dpi).

It will be appreciated that using the printing members of the present invention provides an improvement over the art inter alia since there is a limitation on how small the ejected ink-jet droplets may be made, since smaller droplets are increasingly subject to aerodynamic forces that tend to increase their deviation from normal trajectory and because of cross talk effects between the nozzles themselves. Thus, the achievable resolution of the printed image when determined by the resolution of the nozzles is limited.

Ink-jet printing unit 50 (FIG. 2C) is a suitable printing head for applying ink on a printing member having a resolution larger than that of its nozzles.

The printing unit 50 comprises an array of staggered nozzles referenced 52A–52H. In the illustrated embodiment, each row of nozzles includes nozzles sufficiently spaced apart from each other so as to minimize cross talk effects therebetween. Accordingly, the ink image is formed by a relative movement between the printing unit 50 and the printing member 10 so as to enable each row of the unit 50 to apply ink on the corresponding ink receptive dot.

In the illustrated embodiment, the nozzles 52A and 52D apply ink on the ink receptive dots 54A and 54D, the unit 50 or the printing member is then moved so as to enable nozzles 52B and 52E to apply ink on dots 54B and 54E. Similarly, the nozzles 52C and 52F apply ink on dots 54C and 54F and the nozzles 52D and 52G apply ink on the dots 54D and 54G.

It will be appreciated that the arrays 40 and 50 may be formed from any suitable ink-jet printing array known in the art, a non limiting example being the array described in the above mentioned European Patent Application Number 640481.

Figure 3A:
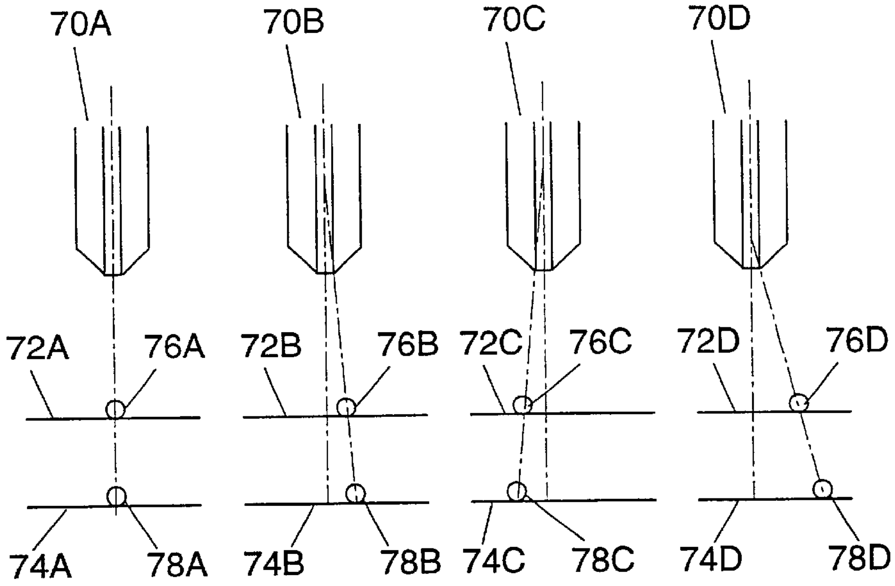
FIGS. 3A–3C illustrate certain advantages of the use of the printing member of FIGS. 1A–1F.
Figure 3B:
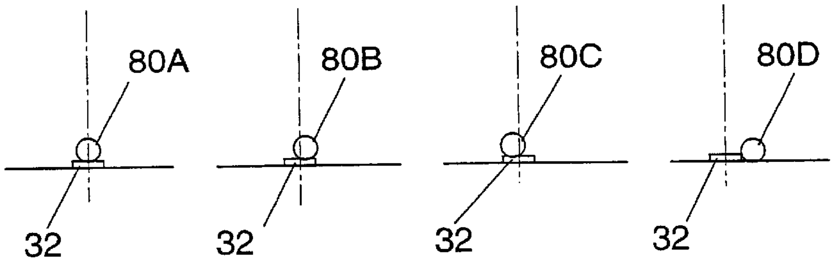
Figure 3C:
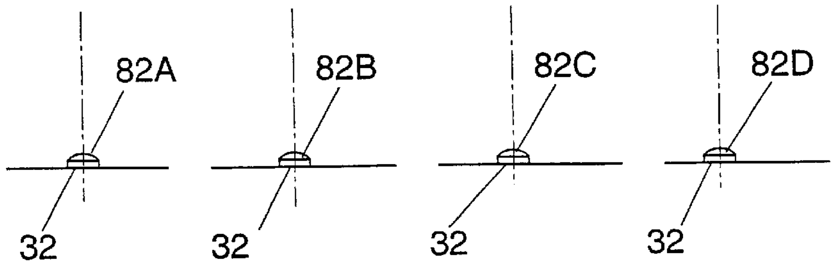

Reference is now made to FIGS. 3A–3C. FIGS. 3A–3C illustrate advantages associated with the use of the printing members of the present invention in terms of the accuracy and uniformity of the applied ink-jet drops.

Typically, the distance of a fibrous printing substrate, such as paper, from the ink-jet nozzles is on the order of one to few millimeters and this distance can be substantially reduced employing the printing members of the present invention since they are not based on fibrous material whose lint may clog the orifices of the nozzles.

FIG. 3A illustrates four schematic ink-jet nozzles, referenced 70A–70D which apply ink on two groups of substrates, referenced 72A–72D and 74A–74D, placed at the distances denoted D1 and D2, respectively. The substrates 72 represent for example the printing members of the present invention which can be located in closer distance to the nozzles 70 than the distance of conventional printing substrates 74, such as paper.

Since the substrates 72A–72D are closer to the nozzles 70, the inaccuracy resulting from a deviation from normal trajectory of ink droplets applied by the nozzles 70 is smaller then for the substrates 74 which are placed at a larger distance. This is shown in particular for the drop 76D vs. drop 78D and to a lesser extent for the drops 76B–76C vs. drops 78B–78C. Drops 76A and 78A are drawn with no deviation for reference.

A further advantage of the printing members of the present invention, shown in FIGS. 3B and 3C is their self centering property which improves both accuracy and uniformity of the ink droplets. As shown in FIG. 3B ink droplets applied with an inaccuracy as shown for drops 80B–80D, are attracted by the ink receptive dots and rejected by the ink repelling surroundings so as to center themselves in the ink receptive dots 82A–82D (FIG. 3C). In the illustrated embodiment the ink receptive dots 32 (FIG. 1C) are shown as a non limiting example.

The resulting dots are more uniformly and accurately placed than dots resulting from application of ink directly on printing substrates, such as paper. The uniformity of the dots during their transfer to the printing substrate employing the printing members of the present invention may also be improved by heating the ink image as described with reference to the printing system of FIG. 4 hereinbelow, thereby increasing the viscosity of the ink and minimizing undesired spreading of the ink when transferred to the printing substrate.

Figure 4:
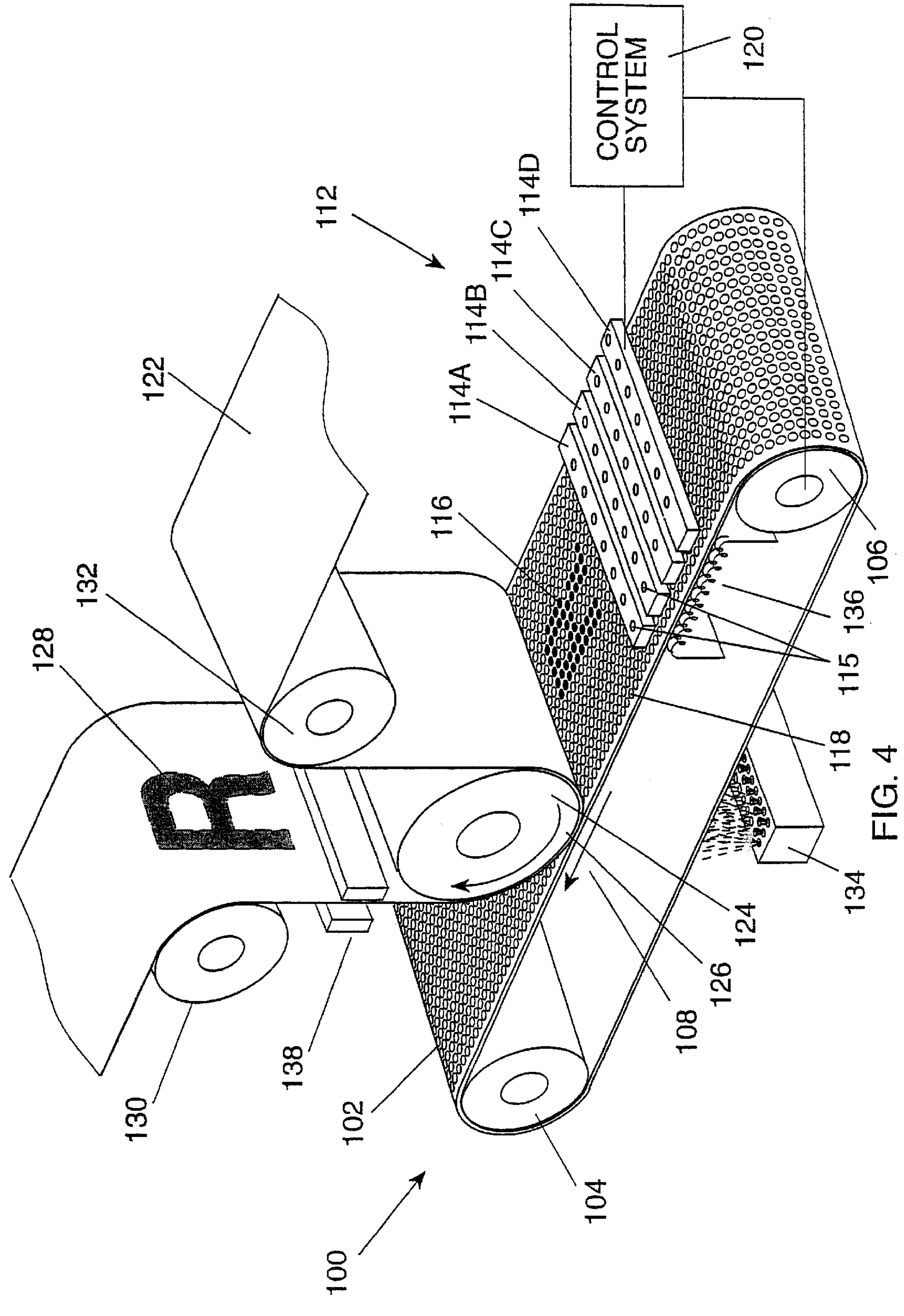
FIG. 4 is a schematic isometric illustration of a belt based indirect digital printing system having a printing member similar to that of any of FIGS. 1A–1F.

FIG. 4 illustrates an indirect digital printing system, generally referenced 100, constructed and operative in accordance with a preferred embodiment of the present invention. The printing system 100 comprises a belt 102, forming a printing member similar to the printing member 10. The belt 102 rotates about rollers 104 and 106 in the direction of arrow 108 in any suitable known mechanism, such as a capstan arrangement.

The system 100 also comprises an ink-jet printing unit 112 which preferably comprises a plurality of linear arrays, of which four 114A–114D are shown herein, arranged in staggering relationship therebetween as described in detail hereinabove with respect to FIG. 2C. Each of the arrays 114 includes a plurality of nozzles for applying ink drops on the belt 102. Two exemplary nozzles are referenced 115.

The ink-jet printing unit 112 selectively applies ink onto the belt 102 so as to form an ink image 116 in a resolution defined by the grid of ink receptive dots 118 on the belt 102. Ink image 116 is formed in accordance to digital data representing the image stored in the control system 120. The control system 120 may be any suitable computer operating to store the digital representations of the images to be printed , to output them so as to control the ink-jet printing unit which applies ink in accordance with the digital representation and which further operates to control the operation of the system components.

The ink image 116 is transferred to the printing substrate 122 impressed against an impression cylinder 124, the cylinder 124 rotating in the direction designated by arrow 126, so as to form a printed image 128 thereon. It will be appreciated that the image 128, is on the other side of substrate 122 and shown through the printing substrate for illustration purposes.

The printing substrate can be fed between the impression cylinder 124 and the belt 102 by any suitable mechanism, such as the rollers mechanism schematically illustrated by rollers 130 and 132.

Once the image is transferred to the sheet 122 from the belt 102, the belt is cleaned in a cleaning station 134 and is then ready for receiving ink so as to form a new ink image thereon.

The cleaning station 134 may be any suitable cleaning station known in the art, for example, a cleaning station based on high pressurized gas, such as a high pressured air based cleaning station.

As optional features, the printing system 100 may include a heating system 136 for heating the belt 102, thereby drying the ink applied thereon as described hereinabove and an Ultra violet (UV) curing system 138 for curing the ink in case UV curable inks are used by the ink-jet printing unit 112.

The UV curing system may be any UV curing system known in the art. A non limiting example is the DRS UV curing system commercially available from Fusion Inc. of the United States.

It will be appreciated that while the illustrated embodiment has been described with respect to a belt forming a printing member similar to the printing member 10, the belt 102 may be similar to either of the printing members 10, 20 and 30.

Figure 5:
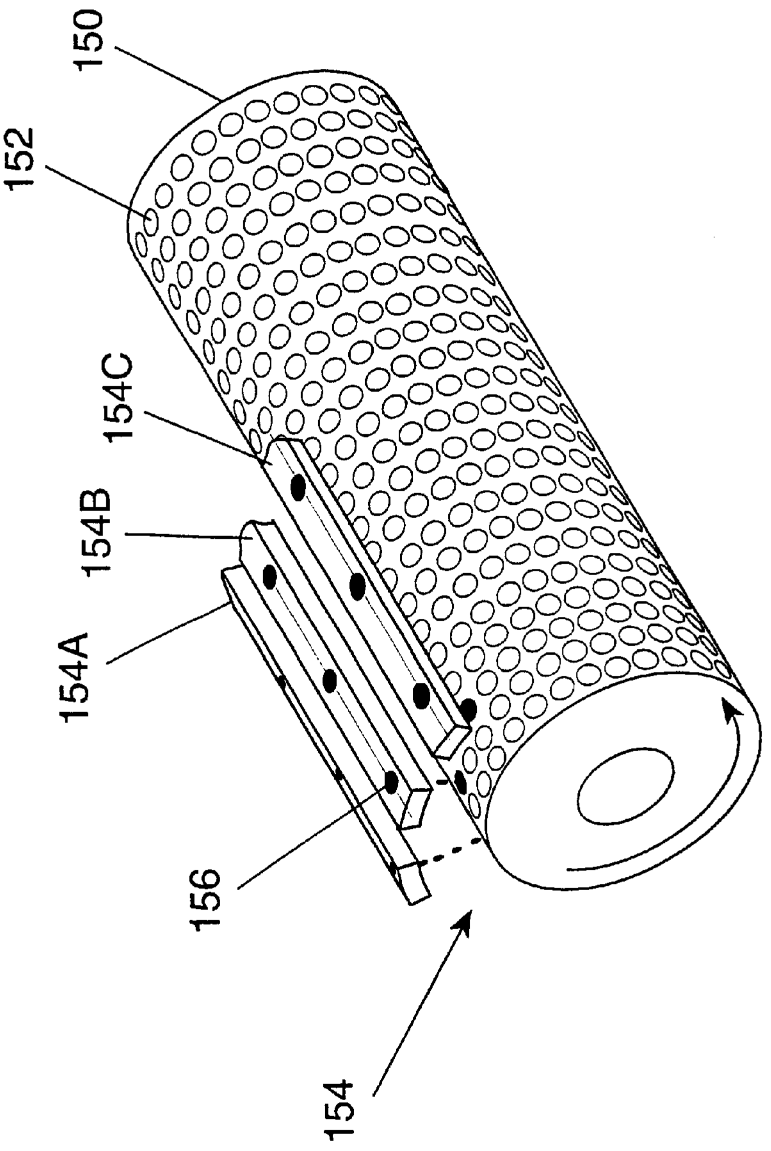
FIG. 5 is a schematic isometric illustration of a printing cylinder having a printing member similar to any of the printing members of FIGS. 1A–1F and an ink-jet printing unit suitable for applying ink thereon.

Reference is now made to FIG. 5 which illustrates the application of a plurality of linear ink-jet arrays for applying ink on a printing cylinder as shown for the printing systems of FIGS. 6–10.

The printing cylinder of FIG. 5, referenced 150 is either formed in the shape of a printing member or is capable for mounting thereon a printing member. In the illustrated embodiment, the cylinder 150 is formed so as to have the ink receptive dots 152 thereon.

An ink-jet printing unit 154 for applying ink on the cylinder 150 so as to form an ink image thereon is preferably similar to the ink-jet printing unit 112 (FIG. 4), i.e. it includes a plurality of linear arrays of which three 154A–154C are shown, in a staggered arrangement therebetween.

Each of the arrays 154 includes a plurality of nozzles of which only one is referenced 156. A particular feature of the arrays 154 is their similar radial distance from the printing cylinder 150.

In the illustrated embodiment, for illustration purposes only, the printing cylinder is similar to the printing member 10. It will be appreciated that the printing cylinder can be formed in the shape of or being capable for mounting thereon any of the printing members of the present invention as illustrated with respect to the indirect digital printing systems illustrated with reference to FIGS. 6–8 hereinbelow.

Figure 6:
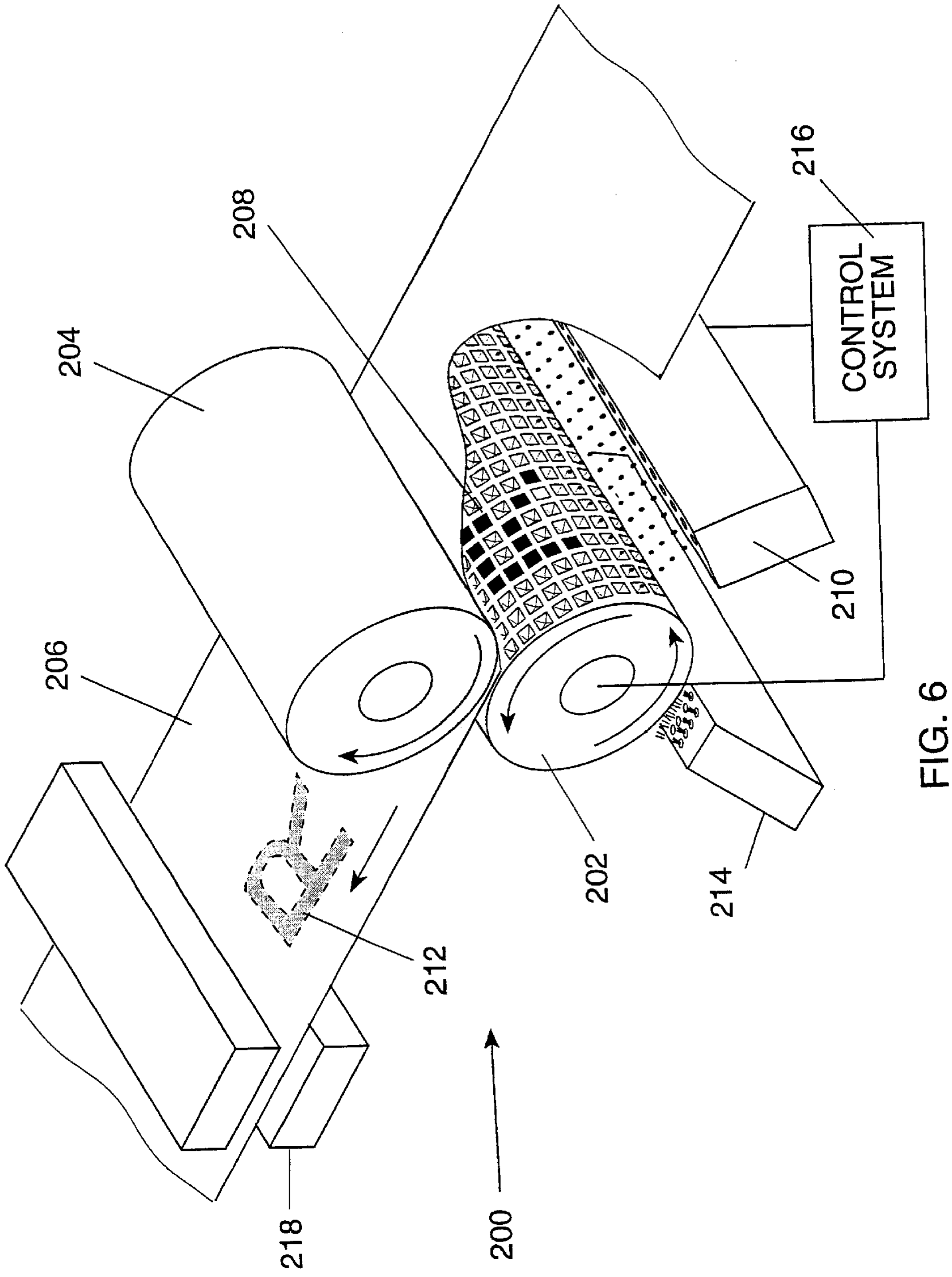
FIGS. 6–8 are schematic isometric illustrations of three indirect digital printing systems.
Figure 7:
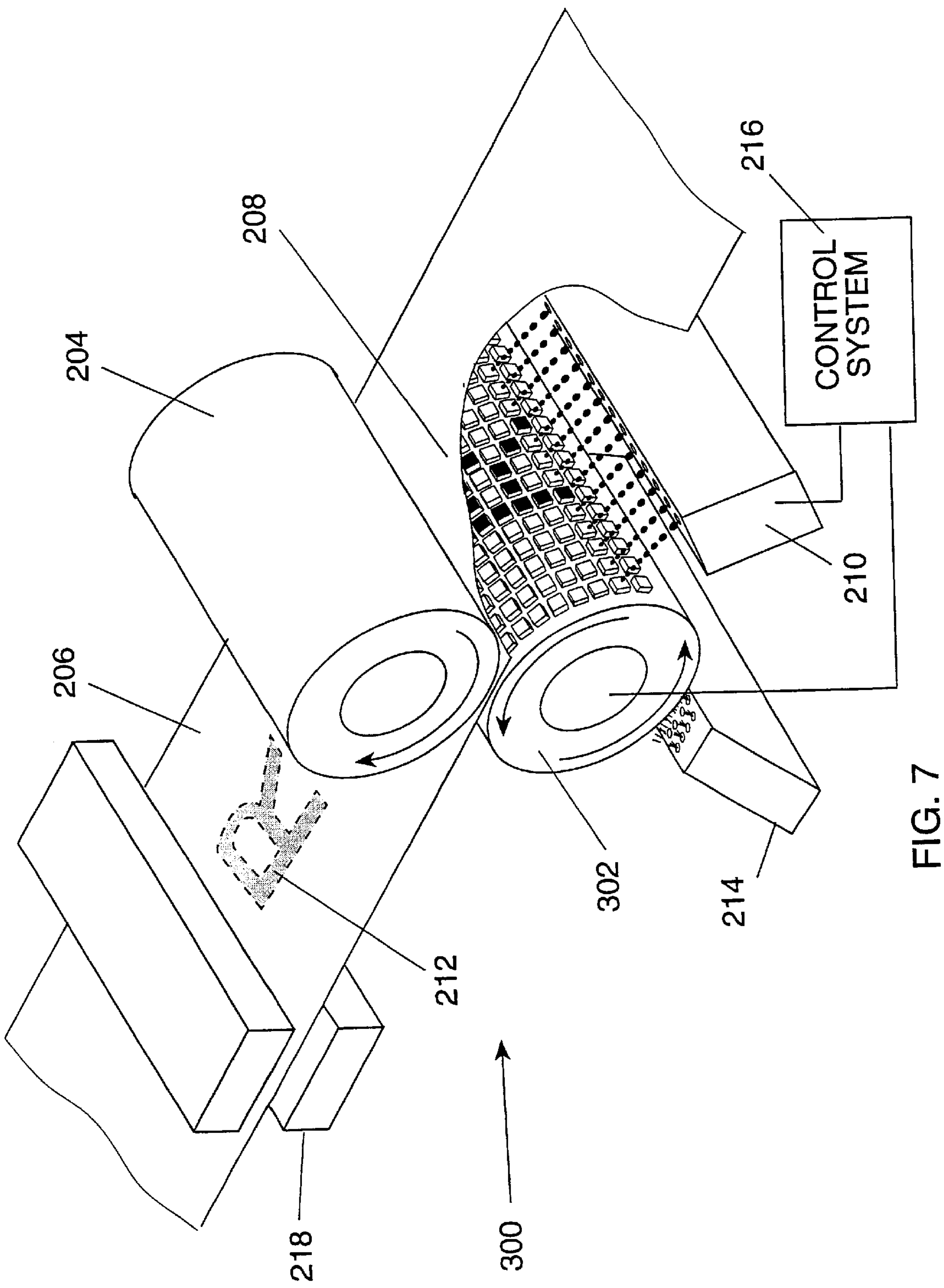
Figure 8:
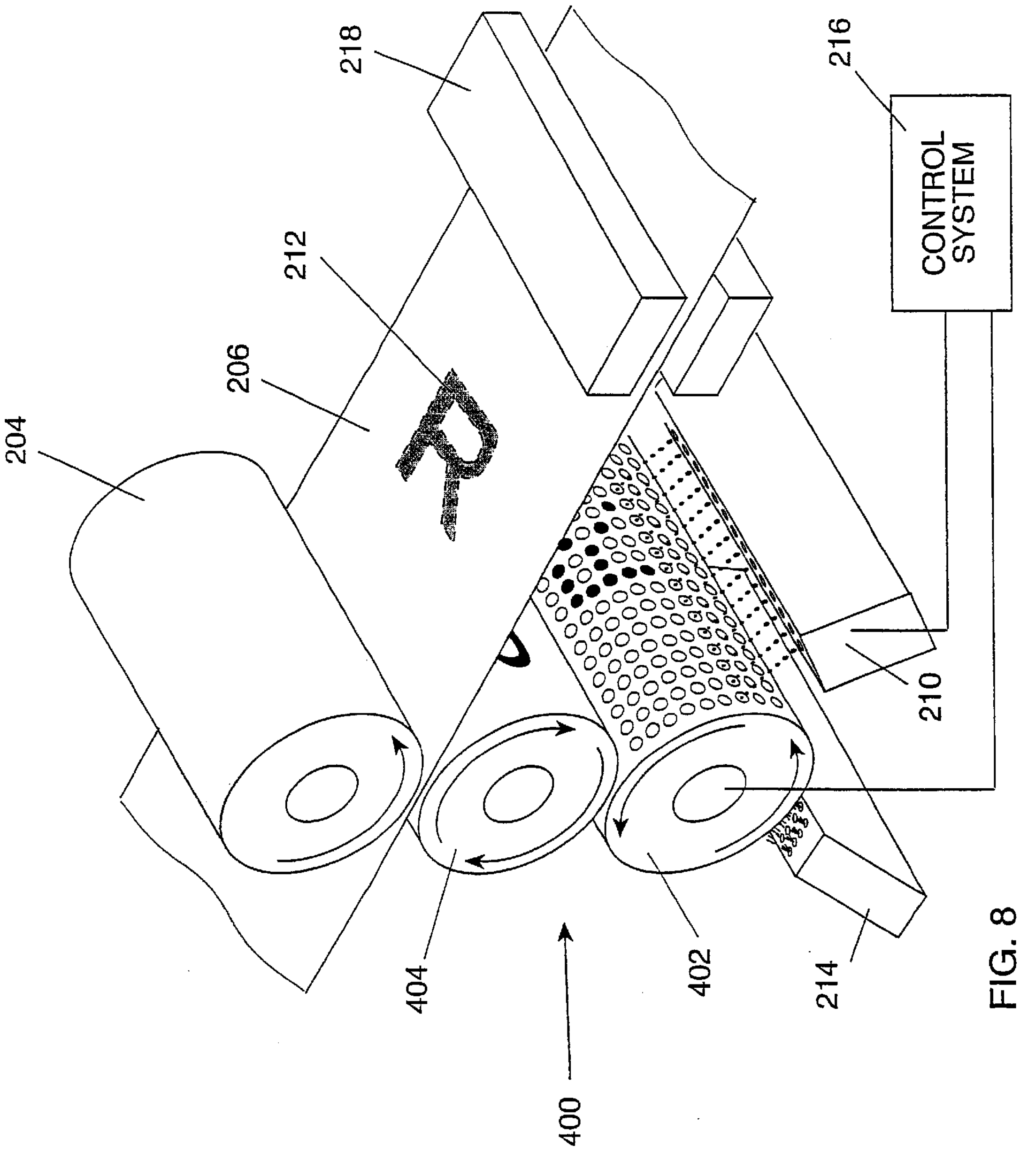

FIGS. 6–8 illustrate a gravure like, a letter press like and an offset like printing presses, referenced 200, 300 and 400, respectively.

The indirect digital printing system 200 comprises a printing cylinder 202 forming a printing member similar to that of printing member 20, an impression cylinder 204 and a printing substrate 206 cut away so as to expose an ink image 208 formed on the printing cylinder by employing an ink-jet printing unit 210. The ink jet printing unit is preferably but not necessarily similar to the ink-jet printing unit 154.

Once the ink image 208 is formed and transferred to the substrate 206 so as to form a printed image 212 on the substrate 206, the cylinder 202 is cleaned in a cleaning station 214 so that it can receive a new ink image thereon. The image 212 is on the other side of the substrate 206 and shown therethrough for illustration purposes.

The printing system 200 also include a control system 216 and may include a UV curing station 218 in case a UV curable ink is applied to form the ink image 208. It may also include a heating system (not shown) similar to the heating system 136 (FIG. 4).

The printing system 300 (FIG. 7) is generally similar to the printing system 200, and therefore, similar reference numerals are used in FIGS. 6 and 7. However, the printing member of the printing system 300 is a printing member similar to the printing member 30 mounted on the printing cylinder 302 or forming the printing cylinder itself.

FIG. 8 illustrates an offset like indirect printing system having an offset like printing member 402 mounted thereon or forming the printing cylinder itself. The printing system 400 comprises in addition to the elements of the printing systems 200 and 300 referenced by similar reference numerals, a blanket cylinder 404 for receiving the ink image formed on the cylinder 402 and for transferring it to the printing substrate 206 as printed image 212.

Figure 9:
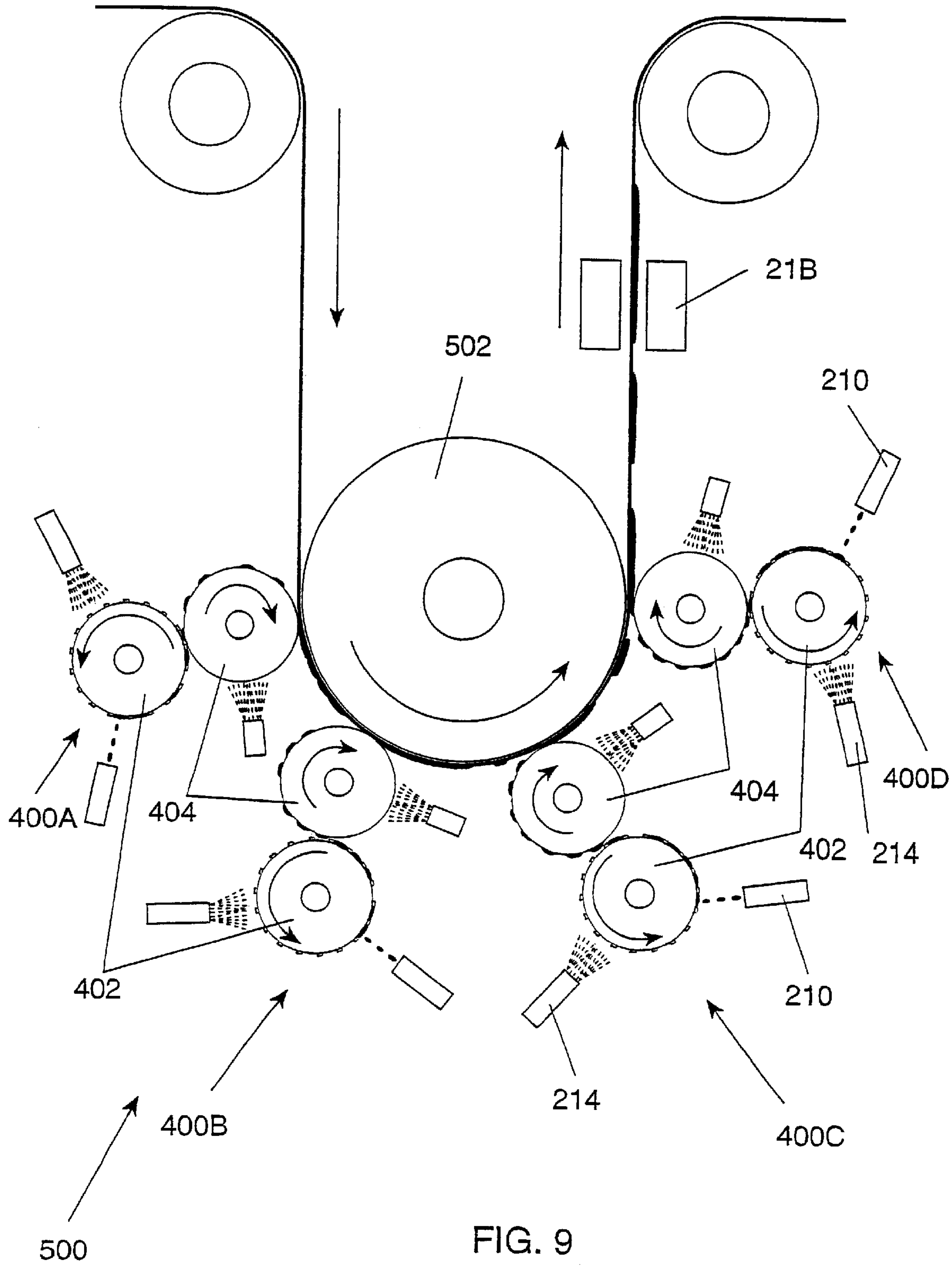
FIGS. 9–10 are schematic isometric illustrations of two printing systems, comprising a plurality of printing cylinders and a single impression cylinder.
Figure 10:
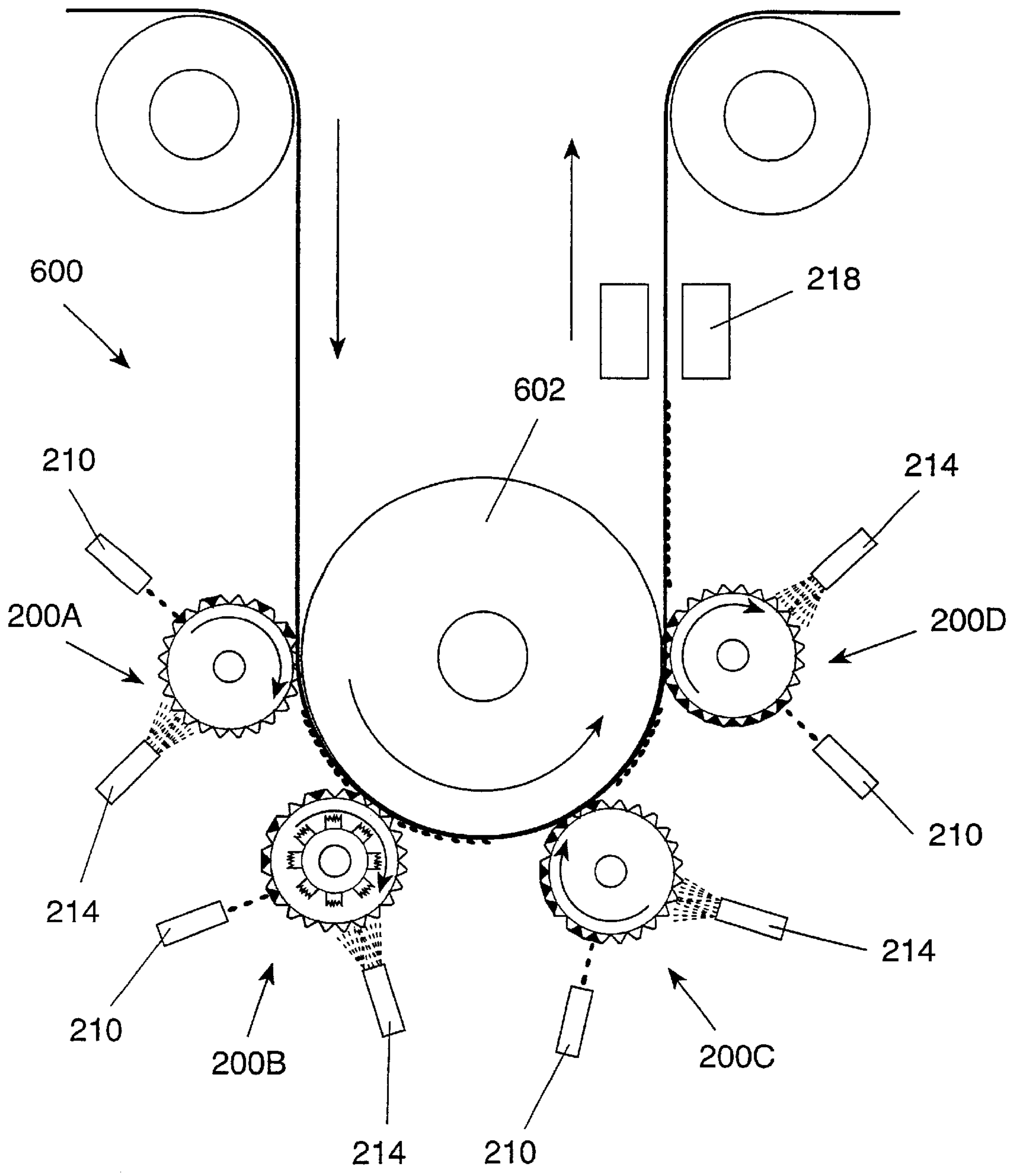

It will be appreciated that the printing systems 100, 200, 300 and 400 may be utilized as a stand alone printing system or as a printing apparatus forming part of a larger printing system as illustrated in FIGS. 9–10 hereinbelow.

Also, it will be appreciated that as a stand alone printing system the printing systems 100, 200, 300 and 400 may be utilized for multicolor or monochrome color printing.

FIG. 9 illustrates a multi color printing system, generally referenced 500. The printing system 500 comprises a plurality of printing stations, each being similar to the printing system 400 (FIG. 8) except the impression cylinder 502 which is common to all printing stations.

In the illustrated embodiment, four printing stations designated 400A–400D are used to apply the four process colors Cyan, Magenta, Yellow and Black, known in the art as CMYB or CMYK colors.

FIG. 10 illustrates a multicolor printing system directed to a gravure or letter press like configuration. The printing system, generally referenced 600, comprises a plurality of printing stations, each being similar to that of the printing systems 200 and 300, respectively, except the impression cylinder 602 which is common to all printing stations.

In the illustrated embodiment, four printing stations in a gravure like configuration are shown and referenced 200A–200D for printing the image with the CMYK colors.

A further advantage of the printing systems of the present invention is that they provide improved registration, i.e. correct positional overlap between corresponding printed dots of different colors. Since the printing members are used in a cyclic fashion, separable set-up for each image is not required.

It will be appreciated that the present invention is not limited by what has been described hereinabove and that numerous modifications, all of which fall within the scope of the present invention, exist. For example, while the present invention has been described with respect to ink-jet printing it is equally applicable to any printing method capable of selectively applying ink so as to form the ink image. Examples for such printing methods are thermal wax transfer, thermal sublimation and toner jet. Furthermore, while the present invention has been described with respect to ink, it is equally applicable to any other colorant, such as toners, which may be applied to form an ink image by various processes, such as electrography, electrophotography, and iongraphy.

It will be appreciated by persons skilled in the art that the present invention is not limited by what has been particularly shown and described hereinabove. Rather the scope of the invention is defined by the claims which follow:

1. A printing system comprising:

an ink jet device comprising at least one ink jet nozzle for ejecting ink in the form of droplets;

a plurality of ink attracting areas, each of said ink attracting areas within an ink repelling area;

said ink attracting and repelling areas adapted for placement of an inked pattern thereon, said pattern corresponding to a representation of an image; and a substantial portion of each of said ink attracting areas sized and configured for catching at least one ink jet ejected droplet from said at least one ink jet nozzle of said ink-jet device aligned therewith and adapted to be responsive to contact with said at least one droplet, for distributing said at least one droplet substantially over said at least one ink attracting area, and retaining said at least one droplet thereon, and further adapted to release said at least one retained droplet to a printable substrate upon contact therewith.

2. The printing system of claim 1, wherein said printing system comprises at least two layers, a first layer forming said ink attracting areas and a second layer forming said ink repelling areas.

3. The printing system of claim 2, wherein said ink attracting areas include dots, of a shape selected from the group comprising: circular, rectangular, square, polygonal or irregular, or combinations thereof.

4. The printing system of claim 1, wherein said printing system includes depressions forming said ink attracting areas and elevated portions forming said ink repelling areas.

5. The printing system of claim 4, wherein said ink attracting areas include dots, of a shape selected from the group comprising: circular, rectangular, square, polygonal or irregular.

6. The printing system of claim 1, wherein said printing system includes elevated portions forming said ink attracting areas and depressions forming said ink repelling areas.

7. The printing system of claim 6, wherein said ink attracting areas include dots, of a shape selected from the group comprising: circular, rectangular, square, polygonal or irregular.

8. The printing system of claim 1, wherein each of said ink attracting areas comprises a randomly generated pattern.

9. The printing system of claim 1, wherein said ink attracting areas are configured in a predetermined resolution.

10. The printing system of claim 9, wherein said predetermined resolution comprises a plurality of grid points.

* * * * *